(12) United States Patent
Wang et al.

(10) Patent No.: US 10,955,888 B2
(45) Date of Patent: Mar. 23, 2021

(54) UNIVERSAL SERIAL BUS DEVICE AND METHOD FOR DYNAMICALLY DEFINING A POWER SOURCE OR SINK STATUS FOR DOWNSTREAM FACING PORTS

(71) Applicant: VIA LABS, INC., New Taipei (TW)

(72) Inventors: Tze-Shiang Wang, New Taipei (TW); Chi-Yuan Kao, New Taipei (TW)

(73) Assignee: VIA LABS, INC., New Taipei (TW)

( * ) Notice: Subject to any disclaimer, the term of this patent is extended or adjusted under 35 U.S.C. 154(b) by 111 days.

(21) Appl. No.: 16/103,941

(22) Filed: Aug. 15, 2018

(65) Prior Publication Data

US 2019/0235593 A1 Aug. 1, 2019

Related U.S. Application Data

(60) Provisional application No. 62/623,488, filed on Jan. 29, 2018.

(30) Foreign Application Priority Data

Jul. 27, 2018 (TW) ................................. 107125971

(51) Int. Cl.
*G06F 1/26* (2006.01)
*G06F 13/42* (2006.01)
(Continued)

(52) U.S. Cl.
CPC ............ *G06F 1/266* (2013.01); *G06F 13/382* (2013.01); *G06F 13/4282* (2013.01); *G06F 1/26* (2013.01); *G06F 1/263* (2013.01); *G06F 13/4022* (2013.01)

(58) Field of Classification Search
CPC . G06F 1/26; G06F 1/266; G06F 1/263; G06F 13/4022; G06F 13/382; G06F 13/4282
(Continued)

(56) References Cited

U.S. PATENT DOCUMENTS 9,727,109 B2 8/2017 Hundal et al.
2013/0191653 A1* 7/2013 Shih ................... H02J 2207/40
713/300

(Continued)

FOREIGN PATENT DOCUMENTS

CN 102567238 7/2012
CN 103425613 12/2013
(Continued)

OTHER PUBLICATIONS

"Office Action of Taiwan Counterpart Application", dated May 30, 2019, p. 1-p. 4.
(Continued)

*Primary Examiner* — Ji H Bae
(74) *Attorney, Agent, or Firm* — JCIPRNET (57) ABSTRACT

The present invention provides a universal serial bus (USB) device and an operating method thereof. The USB device includes a plurality of Downstream Facing Ports (DFPs) and a control circuit. When a first external device is connected to the first DFP and the second DFP is not connected to any external device, the control circuit maintains the first DFP as one of a power source port and a power sink port according to the first external device, and maintains the second DFP as other one of the power source port and the power sink port regardless of whether the second DFP is connected to a second external device later until the first external device is removed from the first DFP.

25 Claims, 3 Drawing Sheets

(51) Int. Cl.
*G06F 13/38* (2006.01)
*G06F 13/40* (2006.01)

(58) Field of Classification Search
USPC .................................. 713/300, 340; 710/12
See application file for complete search history.

(56) References Cited

U.S. PATENT DOCUMENTS

| | | | |
|---|---|---|---|
| 2016/0216750 A1* | 7/2016 | Hundal | G06F 13/4282 |
| 2016/0216757 A1* | 7/2016 | Kim | G06F 1/266 |
| 2017/0220090 A1 | 8/2017 | Kim | |
| 2017/0293335 A1 | 10/2017 | Dunstan et al. | |
| 2017/0351638 A1* | 12/2017 | Chen | G06F 13/4022 |
| 2018/0012559 A1 | 1/2018 | Hundal et al. | |
| 2018/0032350 A1* | 2/2018 | Lee | G06F 1/16 |
| 2018/0052432 A1* | 2/2018 | Kim | G05B 15/02 |
| 2018/0341310 A1* | 11/2018 | Lambert | G06F 1/266 |
| 2019/0068479 A1* | 2/2019 | Fu | H04L 12/40045 |

FOREIGN PATENT DOCUMENTS

| | | |
|---|---|---|
| CN | 104021101 | 9/2014 |
| CN | 104731737 | 6/2015 |
| TW | I428761 | 3/2014 |

OTHER PUBLICATIONS

"Office Action of China Counterpart Application", dated Feb. 3, 2020, p. 1-p. 8.
Apple Inc et al., Universal Serial Bus Type-C Cable and connector Specification, 2017 USB 3.0 Promoter Group, Jul. 14, 2017, Release 1.3, p. 1-247.

* cited by examiner

UNIVERSAL SERIAL BUS DEVICE AND METHOD FOR DYNAMICALLY DEFINING A POWER SOURCE OR SINK STATUS FOR DOWNSTREAM FACING PORTS

CROSS-REFERENCE TO RELATED APPLICATION

This application claims the priority benefits of U.S. provisional application Ser. No. 62/623,488, filed on Jan. 29, 2018 and Taiwan application serial no. 107125971, filed on Jul. 27, 2018. The entirety of each of the above-mentioned patent applications is hereby incorporated by reference herein and made a part of this specification.

BACKGROUND OF THE INVENTION

Field of the Invention

The invention is related to an electronic device, and particularly to a universal serial bus (USB) device and an operating method thereof.

Description of Related Art

In order to reduce the size of electronic device, it is better for electronic device to be equipped with less number of connector. For example, some smart phones are only equipped with one universal serial bus type C (USB type-C, also referred to as USB-C) connector. More smart phones are only equipped with one USB-C connector while the 3.5 mm audio-jack is removed. The USB-C connector on smart phone may be regarded as downstream facing port (DFP). When charger is connected to the USB-C connector, smart phone is charged through the charger. When the earphone is connected to the USB-C connector, user can listen to the music played by the smart phone through the earphone. No matter under what circumstances, when the earphone is connected to the USB-C connector, the user cannot use the charger to charge the smart phone, and vice versa. Since there is a small number of DFP equipped on electronic device, the use of DFP on electronic device is limited.

SUMMARY OF THE INVENTION

The invention provides a universal serial bus (USB) device and an operating method thereof to release limit to the use of downstream facing port (DFP) of host.

The embodiment of the invention provides a USB device. The USB device includes a plurality of DFPs, a plurality of physical layer circuits and a control circuit. The physical layer circuits are coupled to a configuration channel pin (CC pin) of the DFPs one by one. The control circuit is coupled to the physical layer circuits. The control circuit dynamically defines the DFPs by controlling the physical layer circuits. When a first external device is connected to a first DFP of the plurality of DFP s and a second DFP of the plurality of DFP is not connected to any external device, the control circuit maintains the first DFP as one of a power source port and a power sink port according to the first external device, and maintains the second DFP as the other one of the power source port and the power sink port regardless of whether the second DFP is connected to a second external device later until the first external device is removed from the first DFP.

An embodiment of the invention provides an operating method of a USB device. The operating method includes the following steps. When a first external device is connected a first DFP of the plurality of DFPs, and a second DFP of the plurality of DFPs is not connected to any external device, the first DFP is maintained as one of a power source port and a power sink port by a control circuit according to the first external device, and a second DFP is maintained as the other one of the power source port and the power sink port regardless of whether the second DFP is connected to a second external device later until the first external device is removed from the first DFP.

Based on the above, through the USB device and the operating method of the embodiments of the invention, the provided two DFPs may respectively dynamically serve as any one of the power source port and the power sink port. When the external device is connected to the first DFP and the second DFP is not connected to any external device, the first DFP is dynamically set as one of the power source port and the power sink port according to the first external device, and the second DFP is dynamically set as the other one of the power source port and the power sink port. Under the condition that the external device is still connected to the first DFP, no matter whether the second DFP is connected to any external device, the role of the second DFP is not changed until the first external device is removed from the first DFP. When the USB device of the embodiment is connected to the DFP of host, the USB device can release the limit to the use of DFP of host.

In order to make the aforementioned features and advantages of the disclosure more comprehensible, embodiments accompanying figures are described in detail below.

DESCRIPTION OF EMBODIMENTS

"Coupling" (or connecting) used in the full disclosure (including the claims) can refer to any direct or indirect connection means. For example, in the disclosure, if the first apparatus is coupled to (or connected to) the second apparatus, it should be interpreted that the first apparatus can be directly connected to the second apparatus, or the first apparatus can be indirectly connected to the second apparatus through another apparatus or a certain connection means. In addition, where possible, the components/the elements/the steps in the drawings and the embodiments herein share the same or similar reference numerals. In different embodiments, the components/the elements/the steps having the same reference numerals or using the same wording may cross-reference to related descriptions.

In some application circumstances, the number of universal serial bus (USB) connector for an electronic device (referred to as "host" hereafter) may not be sufficient. For example, some smart phones (host) are only equipped with one USB t e-C (USB-C) connector, since the number of the USB connector for host is small, the use of USB connector for host is limited. In order to release the limit to the use of USB connector for host, typically a USB hub is used to increase the number of USB connector for host. No matter under what circumstances, a large circuit area is required for conventional USB hub to provide complete function in each of the USB connectors. That is, the size of conventional USB hub is big, which makes it inconvenient to be carried as a portable product. Furthermore, in order for the USB hub to provide complete function in each of the USB connectors, it is inevitable that the power consumption of conventional USB hub is large.

The following embodiments provide a USB device capable of releasing the limit to the use of USB connector for host. It is not required to use complicated circuit like USB hub, the USB device can use simple a switch circuit to switch data transmission path and thus the USB device can save circuit area and power.

Figure 1:
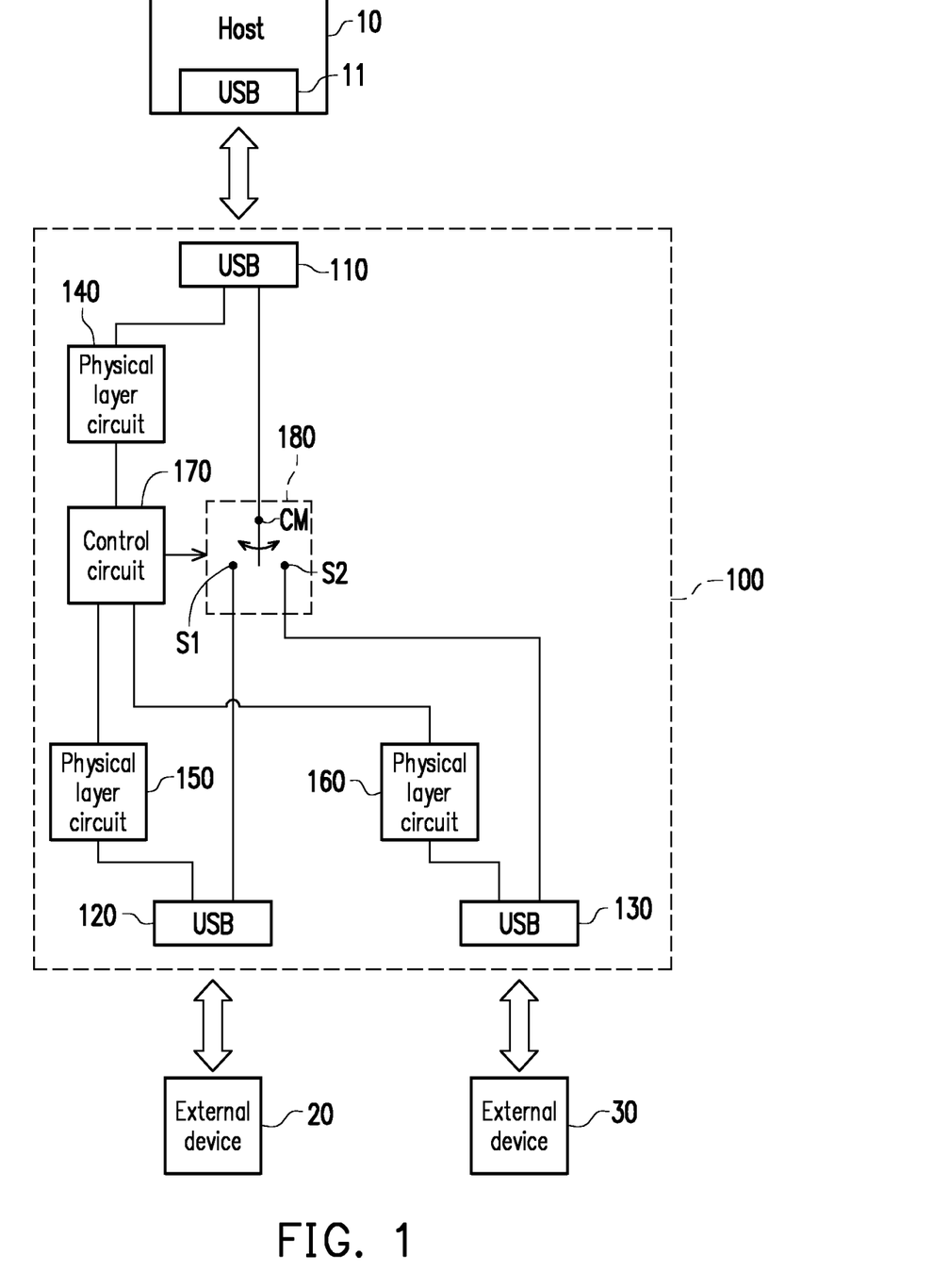
FIG. 1 is a schematic circuit block view of a USB device according to an embodiment of the invention.

FIG. 1 is a schematic circuit block view of a USB device 100 according to an embodiment of the invention. The USB device 100 includes a plurality of USB connectors such as an upstream facing port (UFP) 110, a downstream facing port (DFP) 120 and a DFP 130 shown in FIG. 1. The UFP 110 may be connected to a USB connector (e.g., DFP 11 shown in FIG. 1) of a host 10. Depending on actual application circumstances, the host 10 may be a portable multimedia player (PMP), a personal digital assistance (PDA), a mobile phone, a tablet PC, a notebook computer or other electronic device having USB connector.

The USB device 100 further includes a plurality of physical layer circuits. The physical layer circuits are coupled to a configuration channel pin (CC pin) of the USB connectors of the USB device 100 one by one. For example, the UFP 140 is coupled to the CC pin of the UFP 110, the physical layer circuit 150 is coupled to the CC pin of the DFP 120, and the physical layer circuit 160 is coupled to the CC pin of the DFP 130. A control circuit 170 is coupled to the physical layer circuits 140, 150 and 160. The control circuit 170 is coupled to an upstream physical layer circuit 140. The control circuit 170 transmits configuration information to the host 10 through the CC pin of the upstream physical layer circuit 140 and the UFP 110. The control circuit 170 dynamically defines the role of the DFP 120 and the DFP 130 by controlling the physical layer circuits 150 and 160.

Depending on actual needs, the DFP 120 and/or DFP 130 may be connected to any external device (e.g., external device 20 and external device 30 shown in FIG. 1). Depending on actual application circumstances, the external device 20 and/or the external device 30 may be a USB audio device, (e.g., earphone), a USB video camera, a flash drive, a USB disk, a charger (adaptor) or other USB devices. For example, the external device 20 may be an earphone, and the external device 30 may be a charger. Alternatively, the external device 20 may be a charger, and the external device 30 may be an earphone. Before the first external device is inserted into the DFP 120 or the DFP 130, the DFP 120 and the DFP 130 may be dynamically set as a power source port or a power sink port. That is to say, the roles of the DFP 120 and the DFP 130 are not fixed until any USB external device is inserted into any one of the DFP 120 and the DFP 130.

When the first external device is connected to one (referred to as first DFP hereafter) of the DFPs 120 and 130, and the other one (referred to as second DFP hereafter) of the DFPs 120 and 130 is not connected to any external device, the control circuit 170 maintains the first DFP as one of the power source port and the power sink port according to the first external device, and maintains the second DFP as the other one of the power source port and the power sink port regardless of whether the second DFP is connected to a second external device later until the first external device is removed from the first DFP. The power source port may supply power to the external device, and the power sink port may receive power from the external device.

For example, assuming that the external device 20 is a power source device (e.g., charger), when the charger (external device 20) is connected to the DFP 120 and the DFP 130 is not connected to any external device, the control circuit 170 may maintain the DFP 120 as the power sink port and maintains the DFP 130 as power source port regardless of whether any external device is connected to the DFP 130 later until the external device 20 is removed from the DFP 120. In another application circumstances, assuming that the external device 30 is a power source device (e.g., charger), when the charger (external device 30) is connected to the DFP 130 and the DFP 120 is not connected to any external device, the control circuit 170 may maintain the DFP 130 as the power sink port and maintain the DFP 120 as the power source port regardless of whether any external device is connected to the DFP 120 later until the external device 30 is removed from the DFP 130.

In another example, assuming that the external device 20 is a power sink device (e.g., earphone), when the host 10 is connected to the UFP 110 and the earphone (external device 20) is connected to the DFP 120 and the DFP 130 is not connected to any external device, the control circuit 170 may maintain the DFP 120 as the power source port and maintain the DFP 130 as the power sink port regardless of whether any external device is connected to the DFP 130 later until the external device 20 is removed from the DFP 120. In another application circumstances, assuming that the external device 30 is a power sink device (e.g., earphone), when the host 10 is connected to the DFP 110 and the earphone (external device 30) is connected to the DFP 130 and the DFP 120 is not connected to any external device, the control circuit 170 may maintain the DFP 130 as the power source port and maintain the DFP 120 as the power sink port regardless of whether any external device is connected to the DFP 120 later until the external device 30 is removed from the DFP 130.

In the embodiment shown in FIG. 1, the USB device 100 further includes a data switching circuit 180. The data switching circuit 180 has a common terminal CM, a first selecting terminal S1 and a second selecting terminal S2. The common terminal CM is coupled to a data pin of the UFP 110. The first selecting terminal S1 is coupled to a data pin of the DFP 120. The second selecting terminal S2 is coupled to the data pin of the DFP 130. Depending on the need of design, the "data pin" may be a D pin (a pair of pins of differential signal, typically labelled as D+ and D−), and/or TX1 pin (a pair of output pins of differential signal) and RX1 pin (a pair of input pins of differential signal).

The control circuit 170 controls the data switching circuit 180 according to the connection condition of the DFP 120 and the DFP 130 such that the common terminal CM is selectively connected to the first selecting terminal S1 or the second selecting terminal S2. When the DFP 120 is defined as the power source port and the DFP 130 is defined as the power sink port, the control circuit 170 controls the data switching circuit 180 such that the common terminal CM is selectively connected to the first selecting terminal S1. When the DFP 120 is defined as the power sink port and the DFP 130 is defined as the power source port, the control circuit 170 controls the data switching circuit 180 such that the common terminal CM is selectively connected to the second selecting terminal S2.

Depending on the need of design, in some embodiments, the upstream physical layer circuit 140, the physical layer circuit 150, the physical layer circuit 160, the control circuit 170 and the data switching circuit 180 may be integrated into the same integrated circuit. In some other embodiments, the upstream physical layer circuit 140, the physical layer circuit 150 and the control circuit 170 may be integrated into one integrated circuit, the physical layer circuit 160 may be integrated into another integrated circuit (e.g., type-c port controller, TCPC integrated circuit), and the data switching circuit 180 may be another integrated circuit, wherein the communication interface among the integrated circuits may be an inter-integrated circuit ($I^2C$) interface, general purpose input/output (GPIO) interface and/or other communication interfaces.

Figure 2:
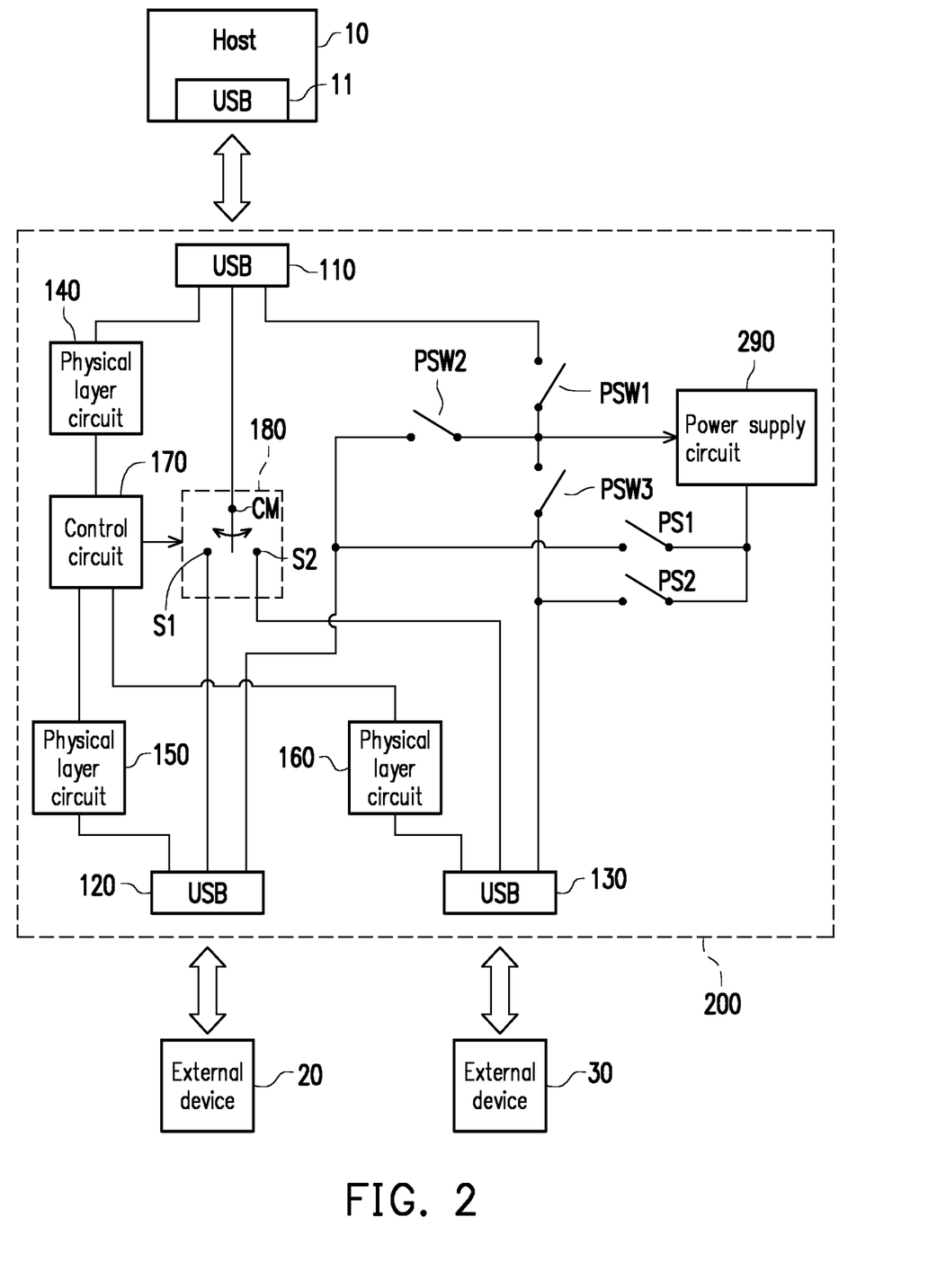
FIG. 2 is a schematic circuit block view of a USB device according to another embodiment of the invention.

FIG. 2 is a schematic circuit block view of a USB device according to another embodiment of the invention. A USB device 200 shown in FIG. 2 includes a plurality of USB connectors (e.g., UFP 110, DFP 120 and DFP 130 shown in FIG. 2), a plurality of physical layer circuits (e.g., upstream physical layer circuit 140, physical layer circuit 150 and physical layer circuit 160 shown in FIG. 2), the control circuit 170, the data switching circuit 180, a power switch PSW1, a power switch PSW2, a power switch PSW3, a power supply circuit 290, a power supply switch PS1 and a power supply switch PS2. Descriptions related to the UFP 110, the DFP 120, the DFP 130, the upstream physical layer circuit 140, the physical layer circuit 150, the physical layer circuit 160, the control circuit 170 and the data switching circuit 180 shown in FIG. 2 may be derived from FIG. 1 and thus no repetition is incorporated herein.

In the embodiment shown in FIG. 2, a first terminal of the power switch PSW1 is coupled to a power pin (power bus pin, typically labelled as Vbus) of the UFP 110. A second terminal of the power switch PSW1 is coupled to a second terminal of the power switch PSW2 and a second terminal of the power switch PSW3. A first terminal of the power switch PSW2 is coupled to a power pin of the DFP 120. A first terminal of the power switch PSW3 is coupled to a power pin of the DFP 130. A power supply circuit 290 may provide power voltage to a power supply switch PS1 and a power supply switch PS2. Depending on the need of design, the power voltage may be any voltage level (e.g., +5 volts) that meets the USB standard. A first terminal of the power supply switch PS1 and a first terminal of the power supply switch PS2 are coupled to an output terminal of the power supply circuit 290 to receive the power voltage. A second terminal of the power supply switch PS1 is coupled to the power pin of the DFP 120, and a second terminal of the power supply switch PS2 is coupled to the power pin of the DFP 130.

The control circuit 170 controls the power switch PSW1, the power switch PSW2, the power switch PSW3, the power supply switch PS1 and the power supply switch PS2 according to the connection condition of the UFP 110, the DFP 120 and the DFP 130. For example, assuming that the external device 20 connected to the DFP 120 is an earphone, and the external device 30 connected to the DFP 130 is a charger. As described above, the DFP 120 is set as the power source port and the DFP 130 is set as the power sink port until the external device 20 and the external device 30 are removed. When the DFP 120 is defined as the power source port and the DFP 130 is defined as the power sink port, the power switch PSW2 and the power supply switch PS2 are turned off, and the power switch PSW1, the power switch PSW3 and the power supply switch PS1 are turned on. At this time, the charger (external device 30) may supply power to the host 10 and the power supply circuit 290 through the DFP 130 and the power switch PSW3, and the power supply circuit 290 may supply power to the earphone (external device 20) through the power supply switch PS1 and the DFP 120.

In yet another example, assuming that the external device 20 connected to the DFP 120 is a charger, and the external device 30 connected to the DFP 130 is an earphone. As described above, the DFP 120 is set as the power sink port, and the DFP 130 is set as the power source port until the external device 20 and the external device 30 are removed. When the DFP 120 is defined as the power sink port and the DFP 130 is defined as the power source port, the power switch PSW3 and the power supply switch PS1 are turned off, and the power switch PSW1, the power switch PSW2 and the power supply switch PS2 are turned on. At this time, the charger (external device 20) may supply power to the host 10 and the power supply circuit 290 through the DFP 120 and the power switches PSW1 and PSW2, and the power supply circuit 290 may supply power to the earphone (external device 30) through the power supply switch PS2 and the DFP 130.

In still another example, assuming that the power pin of the UFP 110, the power pin of the DFP 120 and the power pin of the DFP 130 are rated at the same voltage level (e.g., +5 volts), then the power switch PSW1, the power switch PSW2, the power switch PSW3, the power supply circuit 290, the power supply switch PS1 and the power supply switch PS2 may be omitted depending on the need of design. That is, the power pin of the UFP 110, the power pin of the DFP 120 and the power pin of the DFP 130 may be electrically connected to each other without the power switch.

Figure 3:
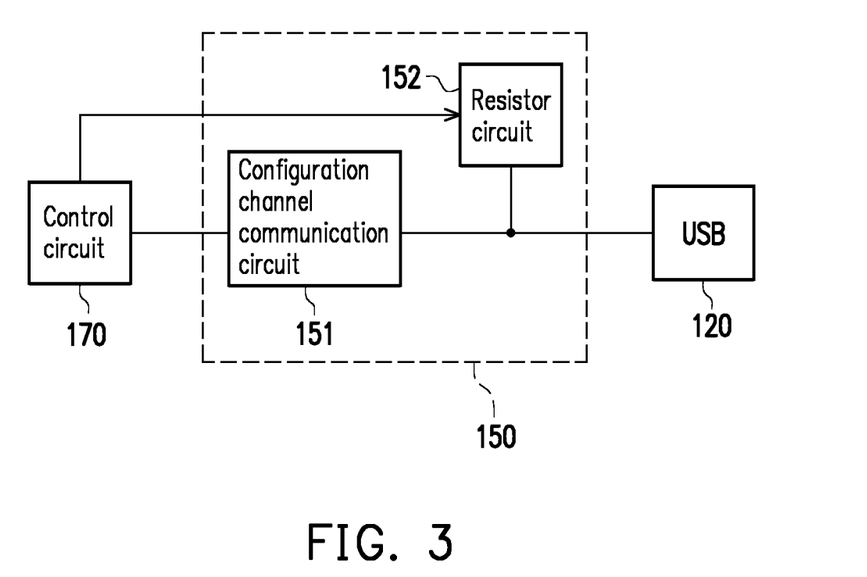
FIG. 3 is a schematic circuit block view of a physical layer circuit in FIG. 1 or FIG. 2 according to an embodiment of the invention.

FIG. 3 is a schematic circuit block view of a physical layer circuit 150 in FIG. 1 or FIG. 2 according to an embodiment of the invention. Other physical layer circuit 140 or 160 shown in FIG. 1 or FIG. 2 may be deduced from related descriptions in FIG. 3 and thus related descriptions are omitted hereinafter. In the embodiment shown in FIG. 3, the physical layer circuit 150 includes a configuration channel communication circuit 151 and a resistor circuit 152. The configuration channel communication circuit 151 is coupled to the CC pin of the DFP 120. The control circuit 170 acquires whether the DFP 120 is connected to any external device through the configuration channel communication circuit 151 and the CC pin of the DFP 120. Depending on the need of design, the configuration channel communication circuit 151 may include a bi-phase mark coding (BMC) physical layer circuit. The BMC physical layer circuit is a conventional circuit and thus related description is omitted hereinafter. When the external device (e.g., external device 20 shown in FIG. 1 or FIG. 2) is connected to the DFP 120, the control circuit 170 may carry out communication with external device through the BMC physical layer circuit and the CC pin to transmit configuration information.

The resistor circuit 152 is coupled to the CC pin of the DFP 120. When the DFP 120 is not connected to any external device, the control circuit 170 controls the resistor circuit 152 such that the resistor circuit 152 applies one of pull-up resistor Rp and pull-down resistor Rd alternately at different times to the CC pin of the DFP 120. Therefore, when the external device (e.g., external device 20 shown in FIG. 1 or FIG. 2) is connected to the DFP 120, the control circuit 170 may acquire the voltage level of the CC pin of the DFP 120 through the configuration channel communication circuit 151. When the Rp and Rd of the DFP 120 are not toggled, the current of the power pin Vbus may be smaller than 0.5 mA. When Rp and Rd of the DFP 120 are toggled, the current of power pin Vbus may be smaller than 1 mA.

Depending on the voltage level of CC pin and the resistance state (Rp or Rd) of the resistor circuit 152, the control circuit 170 may determine whether the DFP 120 is connected to any external device, and determine whether the external device connected to the DFP 120 is the power source device or the power sink device. The pull-up resistor Rp and pull-down resistor Rd are specified in USB standard and thus related descriptions are omitted hereinafter.

When the power source device (external device) is connected to the DFP 120, the control circuit 170 controls the resistor circuit 152 such that the resistor circuit 152 keeps applying the pull-down resistor Rd to the CC pin of the DFP 120 in the period when the DFP 120 is connected to the power source device. That is, in the period when the power source device (external device) is connected to the DFP 120, the DFP 120 is set as the power sink port until the power source device is removed from the DFP 120. When the power sink device (external device) is connected to the DFP 120, the control circuit 170 controls the resistor circuit 152 such that the resistor circuit 152 keeps applying pull-up resistor Rp to the CC pin of the DFP 120 in the period when the DFP 120 is connected to the power sink device. That is, in the period when the power sink device (external device) is connected to the DFP 120, the DFP 120 is set as the power source port until the power sink device is removed from the DFP 120.

The block of the control circuit 170 may be realized as logic circuit (hardware) formed on integrated circuit and may be realized as software by using a central processing unit (CPU). In the latter case, related function of the control circuit 170 may be realized as programming codes of software (i.e., program). For example, general programming languages (e.g., C or C++) or other suitable programming languages may be used to realize the control circuit 170. The software (e.g., program) may be read by computer (or CPU), and may be recorded/stored in read only memory (ROM), a storage device (referred to as "recording media") and/or random access memory (RAM). Also, the program may be read and executed from the recording media by computer (or CPU), thereby achieving related function. "Non-transitory computer readable medium" such as tape, disk, card, semiconductor memory or programmable logic circuit may be used as the recording media. Meanwhile, the program may be provided to the computer (or CPU) through any transmission media (communication network or radio wave etc.). The communication network may be Internet, wired communication, wireless communication or other communication medium.

In different application circumstances, related function of the control circuit 170 may be realized as firmware or hardware by using general programming languages (e.g., C or C++), hardware description languages (e.g., Verilog HDL or VHDL) or other suitable programming languages. For realizing hardware, one or more controllers, microcontroller, microprocessor, application-specific integrated circuit (ASIC), digital signal processor (DSP), field programmable gate array (FPGA) and/or various logic blocks, modules and circuits in other processing units may be used to realize or perform the functions described in the embodiments of the invention. Additionally, the device and the method of the invention may be realized through a combination of hardware, firmware and/software.

In summary, through the USB device and the operating method of the embodiments of the invention, the provided two DFPs 120 and 130 may respectively dynamically serve as any one of the power source port and the power sink port. Therefore, the USB device described in the embodiments of the invention can release the limit to the use of the DFP 11 of the host 10. When the external device is connected to the first DFP (one of DFPs 120 and 130) and the second DFP (the other one of DFPs 120 and 130) is not connected to any external device, the first DFP is dynamically set as one of the power source port and the power sink port according to the external device, and the second DFP is dynamically set as the other one of the power source port and the power sink port. Under the condition that the external device is still connected to the first DFP, no matter whether the second DFP is connected to any external device, the role of the second DFP is not changed until the external device is removed from the first DFP.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A universal serial bus (USB) device, comprising:
a plurality of USB connectors, wherein the USB connectors comprise a plurality of downstream facing ports (DFPs);
a plurality of physical layer circuits, coupled to a configuration channel pin (CC pin) of the DFPs one by one; and
processor, coupled to the physical layer circuits, wherein the processor is configured to dynamically define the DFPs by controlling the physical layer circuits,
when a first external device is connected to a first DFP of the DFPs and a second DFP of the DFPs is not connected to any external device, the processor is configured to maintain the first DFP as one of a power source port and a power sink port according to the first external device and maintains the second DFP as the other one of the power source port and the power sink port regardless of whether the second DFP is connected to a second external device later until the first external device is removed from the first DFP.

2. The USB device according to claim 1, wherein the first external device is a power source device;
when the first external device is connected to the first DFP and the second DFP is not connected to any external device, the processor is configured to maintain the first DFP as the power sink port and the processor is configured to maintain the second DFP as the power source port regardless of whether the second DFP is connected to the second external device later until the first external device is removed from the first DFP; and
when the first external device is connected to the second DFP and the first DFP is not connected to any external device, the processor is configured to maintain the second DFP as the power sink port, and the processor is configured to maintain the first DFP as the power source port regardless of whether the first DFP is connected to the second external device later until the first external device is removed from the second DFP.

3. The USB device according to claim 2, wherein the power source device comprises a charger.

4. The USB device according to claim 1, wherein the first external device is a power sink device;
when the first external device is connected to the first DFP and the second DFP is not connected to any external device, the processor is configured to maintain the first DFP as the power source port, and the processor is configured to maintain the second DFP as the power sink port regardless of whether the second DFP is connected to the second external device later until the first external device is removed from the first DFP; and when the first external device is connected to the second DFP and the first DFP is not connected to any external device, the processor is configured to maintain the second DFP as the power source port, and the processor is configured to maintain the first DFP as the power sink port regardless of whether the first DFP is connected to the second external device later until the first external device is removed from the second DFP.

5. The USB device according to claim 4, wherein the power sink device comprises an earphone.

6. The USB device according to claim 1, further comprising:
an upstream facing port (UFP); and
an upstream physical layer circuit, coupled to a CC pin of the UFP;
wherein the processor is further coupled to the upstream physical layer circuit.

7. The USB device according to claim 6, further comprising:
a data switching circuit, having a common terminal, a first selecting terminal and a second selecting terminal, wherein the common terminal is coupled to a data pin of the UFP, the first selecting terminal is coupled to a data pin of the first DFP, the second selecting terminal is coupled to a data pin of the second DFP;
wherein the processor is configured to control the data switching circuit according to a connection condition of the DFPs such that common terminal is selectively connected to the first selecting terminal or the second selecting terminal.

8. The USB device according to claim 7, wherein
when the first DFP is defined as the power source port and the second DFP is defined as the power sink port, the processor is configured to control the data switching circuit such that the common terminal is selectively connected to the first selecting terminal; and
when the first DFP is defined as the power sink port and the second DFP is defined as the power source port, the control circuit controls processor is configured to control the data switching circuit such that the common terminal is selectively connected to the second selecting terminal.

9. The USB device according to claim 6, further comprising:
a first power switch, having a first terminal coupled to a power pin of the first DFP;
a second power switch, having a first terminal coupled to a power pin of the second DFP, wherein a second terminal of the second power switch is coupled to a second terminal of the first power switch; and
a third power switch, having a first terminal coupled to a power pin of the UFP, wherein a second terminal of the third power switch is coupled to the second terminal of the first power switch and the second terminal of the second power switch;
wherein the processor is configured to control the first power switch, the second power switch and the third power switch according to a connection condition of the DFPs.

10. The USB device according to claim 9, wherein
when the first DFP is defined as the power source port and the second DFP is defined as the power sink port, the first power switch is turned off, the second power switch and the third power switch are turned on; and
when the first DFP is defined as the power sink port and the second DFP is defined as the power source port, the second power switch is turned off, the first power switch and the third power switch are turned on.

11. The USB device according to claim 1, further comprising:
a power supply circuit, configured to provide a power voltage;
a first power supply switch, having a first terminal coupled to an output terminal of the power supply circuit to receive the power voltage, wherein a second terminal of the first power supply switch is coupled to a power pin of the first DFP; and
a second power supply switch, having a first terminal coupled to the output terminal of the power supply circuit to receive the power voltage, wherein a second terminal of the second power supply switch is coupled to a power pin of the second DFP;
wherein the processor is configured to control the first power supply switch and the second power supply switch according to a connection condition of the DFPs.

12. The USB device according to claim 11, wherein
when the first DFP is defined as the power source port and the second DFP is defined as the power sink port, the first power supply switch is turned on and the second power supply switch is turned off; and
when the first DFP is defined as the power sink port and the second DFP is defined as the power source port, the first power supply switch is turned off and the second power supply switch is turned on.

13. The USB device according to claim 1, wherein any one of the physical layer circuits comprises:
a configuration channel communication circuit, coupled to the CC pin, wherein the processor is configured to acquire whether a corresponding DFP of the DFPs is connected to any external device through the configuration channel communication circuit and the CC pin of the corresponding DFP; and
a resistor circuit, coupled to the CC pin, wherein
when the corresponding DFP is not connected to any external device, the processor is configured to control the resistor circuit such that the resistor circuit alternately applies a pull-up resistor and a pull-down resistor to the CC pin at different times,
when the corresponding DFP is connected to a power source device, the processor is configured to control the resistor circuit such that the resistor circuit keeps applying the pull-down resistor to the CC pin in a period when the corresponding DFP is connected to the power source device, and
when the corresponding DFP is connected to a power sink device, the processor is configured to control the resistor circuit such that the resistor circuit keeps applying the pull-up resistor to the CC pin in a period when the corresponding DFP is connected to the power sink device.

14. The USB device according to claim 13, wherein the configuration channel communication circuit comprises a bi-phase mark coding physical layer circuit.

15. An operating method of a USB device, comprising:
when a first external device is connected to a first DFP of a plurality of USB connectors, and a second DFP of the USB connectors is not connected to any external device, maintaining the first DFP as one of a power source port and a power sink port by a processor according to the first external device, and maintaining the second DFP as the other one of the power source port and the power sink port regardless of whether the second DFP is connected to a second external device later until the first external device is removed from the first DFP.

16. The operating method according to claim 15, wherein the first external device is a power source device, and the operating method comprises:
   when the first external device is connected to the first DFP and the second DFP is not connected to any external device, maintaining the first DFP as the power sink port by the processor, and maintaining the second DFP as the power source port by the processor regardless of whether the second DFP is connected to the second external device later until the first external device is removed from the first DFP; and
   when the first external device is connected to the second DFP and the first DFP is not connected to any external device, maintaining the second DFP as the power sink port by the processor, and maintaining the first DFP as the power source port by the processor regardless of whether the first DFP is connected to the second external device later until the first external device is removed from the second DFP.

17. The operating method according to claim 16, wherein the power source device comprises a charger.

18. The operating method according to claim 15, wherein the first external device is a power sink device, and the operating method comprises:
   when the first external device is connected to the first DFP and the second DFP is not connected to any external device, maintaining the first DFP as the power source port by the processor, and maintaining the second DFP as the power sink port by the processor regardless of whether the second DFP is connected to the second external device later until the first external device is removed from the first DFP; and
   when the first external device is connected to the second DFP and the first DFP is not connected to any external device, maintaining the second DFP as the power source port by the processor, and maintaining the first DFP as the power sink port by the processor regardless of whether the first DFP is connected to the second external device later until the first external device is removed from the second DFP.

19. The operating method according to claim 18, wherein the power sink device comprises an earphone.

20. The operating method according to claim 15, further comprising:
   providing a data switching circuit, wherein a common terminal of the data switching circuit is coupled to a data pin of a UFP, a first selecting terminal of the data switching circuit is coupled to a data pin of the first DFP, a second selecting terminal of the data switching circuit is coupled to a data pin of the second DFP;
   controlling the data switching circuit by the processor according to a connection condition of the DFPs, such that the common terminal is selectively connected to the first selecting terminal or the second selecting terminal.

21. The operating method according to claim 20, further comprising:
   when the first DFP is defined as the power source port and the second DFP is defined as the power sink port, controlling the data switching circuit by the processor such that the common terminal is selectively connected to the first selecting terminal; and
   when the first DFP is defined as the power sink port and the second DFP is defined as the power source port, controlling the data switching circuit by the processor such that the common terminal is selectively connected to the second selecting terminal.

22. The operating method according to claim 15, further comprising:
   providing a first power switch, a second power switch and a third power switch, wherein a first terminal of the first power switch is coupled to a power pin of the first DFP, a first terminal of the second power switch is coupled to a power pin of the second DFP, a first terminal of the third power switch is coupled to a power pin of a UFP, a second terminal of the third power switch is coupled to a second terminal of the first power switch and a second terminal of the second power switch;
   controlling the first power switch, the second power switch and the third power switch by the processor according to a connection condition of the DFPs.

23. The operating method according to claim 22, further comprising:
   when the first DFP is defined as the power source port, and the second DFP is defined as the power sink port, turning off the first power switch and turning on the second power switch and the third power switch; and
   when the first DFP is defined as the power sink port, and the second DFP is defined as the power source port, turning off the second power switch and turning on the first power switch and the third power switch.

24. The operating method according to claim 15, further comprising:
   providing a power voltage;
   providing a first power supply switch and a second power supply switch, wherein a first terminal of the first power supply switch receives the power voltage, a second terminal of the first power supply switch is coupled to a power pin of the first DFP, a first terminal of the second power supply switch receives the power voltage, a second terminal of the second power supply switch is coupled to a power pin of the second DFP; and
   controlling the first power supply switch and the second power supply switch by the processor according to a connection condition of the DFPs.

25. The operating method according to claim 24, further comprising:
   when the first DFP is defined as the power source port, and the second DFP is defined as the power sink port, turning on the first power supply switch and turning off the second power supply switch; and
   when the first DFP is defined as the power sink port, and the second DFP is defined as the power source port, turning off the first power supply switch and turning on the second power supply switch.

* * * * *